Aug. 14, 1956

S. M. SHONE 2,758,847

COLLAPSIBLE BABY STROLLER

Filed March 11, 1954

INVENTOR.
SAMUEL M. SHONE,

By His Attorneys.
HARRIS, KIECH, FOSTER & HARRIS.

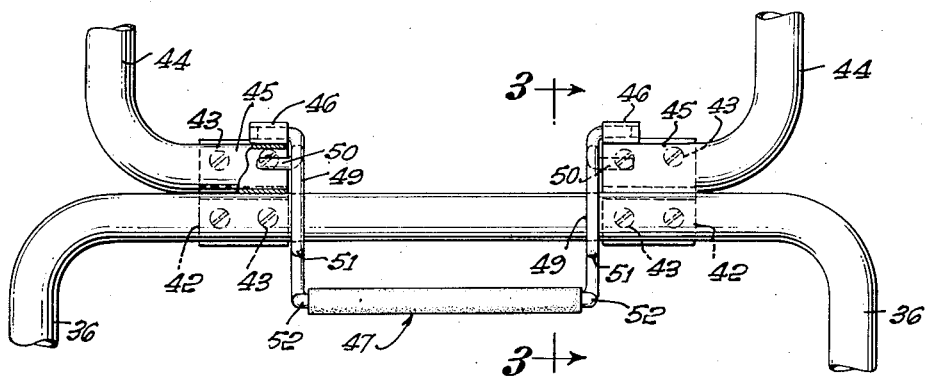
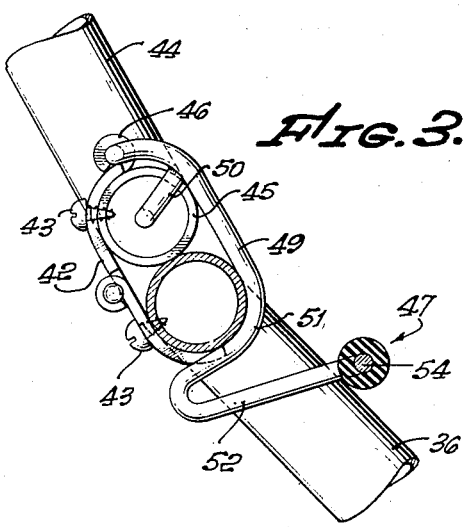
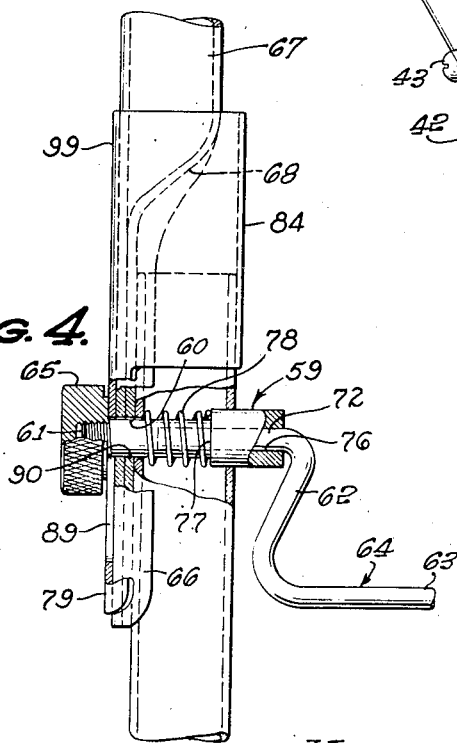

United States Patent Office 2,758,847
Patented Aug. 14, 1956

2,758,847

COLLAPSIBLE BABY STROLLER

Samuel M. Shone, Los Angeles, Calif.

Application March 11, 1954, Serial No. 415,540

5 Claims. (Cl. 280—36)

The present invention relates to a new and improved type of combination baby stroller and walker.

During the past fifty years, seemingly all possible kinds, sizes, shapes and varieties of baby strollers and baby walkers have been marketed by a number of concerns. All of these prior devices have been reasonably effective for the purpose described, but none of them have achieved the ultimate possible success. It is believed the reason none of these prior art devices has sold as widely as possible may relate to their size and weight.

To be completely acceptable in the present market, a baby stroller must be extremely light, must be capable of being folded into a small unit which can be readily carried by an individual and must be capable of serving more than one function.

It is an object of the present invention to produce a device of the class described, meeting all of these qualifications. A further object of the present invention is to produce a new and improved type of baby stroller and walker, which is convenient to manufacture, which is extremely light weight and which can be readily folded or opened, depending upon the circumstances, by an individual completely lacking in mechanical skill. Further objects of the present invention, as well as the advantages of it, will be apparent in the balance of this specification, including the appended claims and accompanying drawings, in which:

Fig. 2 is a partial end view taken in the direction of the arrow 2 in Fig. 1;

Fig. 3 is a partial sectional view taken along line 3—3 of Fig. 2;

Fig. 4 is a partial end view taken in the direction of the arrow 4 in Fig. 1.

For convenience, like numerals are used to designate like parts in all figures of the drawings.

Briefly, the above and related aims of the present invention are achieved by forming a new and improved baby stroller-walker, in which new and improved linkages are provided for holding the various elements of the stroller in an open or unfolded position. This construction will perhaps be best fully understood with a reference to the accompanyig drawings.

Figure 1:
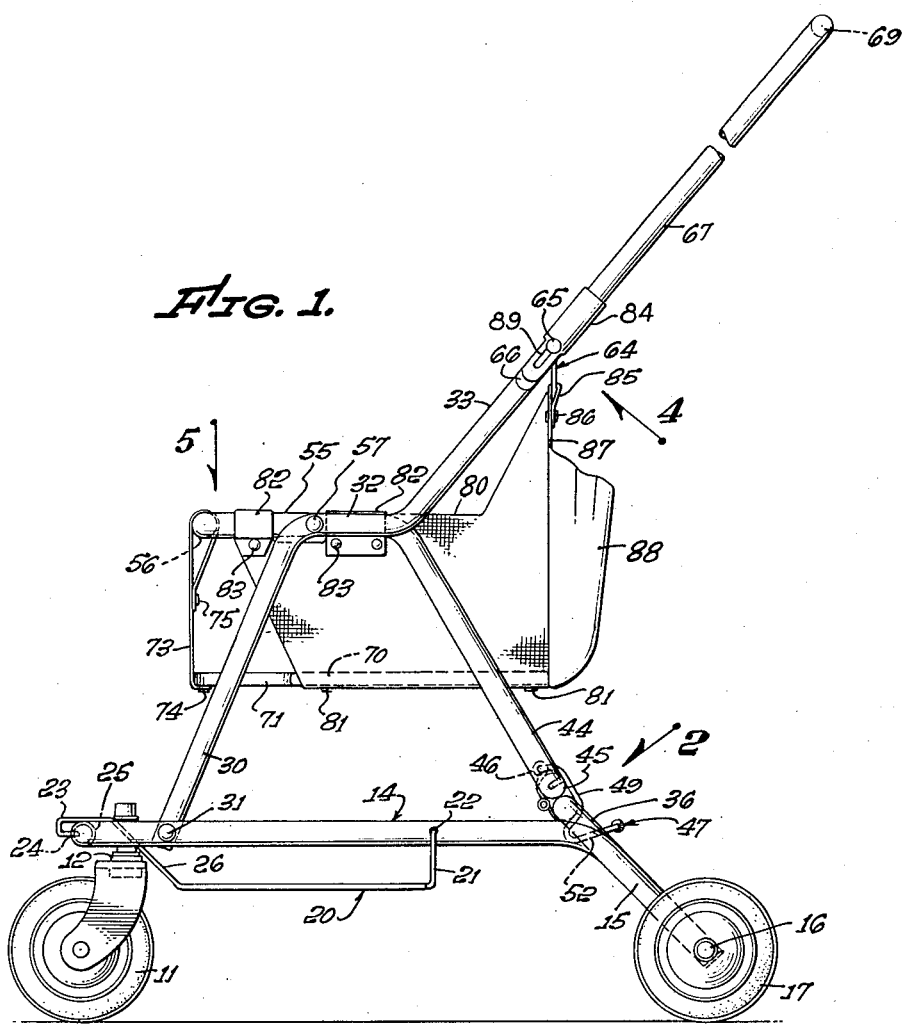
Fig. 1 is a side view of a new stroller of the present invention.

In Fig. 1 of the drawings, it is seen that the new baby stroller and walker of the present invention utilizes front wheels 11 pivoted in bearings 12 mounted within tubular lower side members 14, the terminal extremities of which are provided with turned down portions 15, containing at their lower extremities a shaft 16, holding rear wheels 17 externally of the device. The rear portion of a grate-like foot supporting structure 20 is attached beneath the supporting members 14 by means of wire prongs 21 fitting within apertures 22 in the supporting members 14. The front portion of the supporting structure 20 contains an upwardly slanting front wall 26, terminating in a U-shaped front supporting member 23, which, in turn, fits within apertures 24 in a front supporting member 25 integrally formed with the side supporting members 14.

Adjacent to the front wheels 11, front supporting bars 30 are attached to the supporting members 14, by means of pivots 31. As is shown in Fig. 1, these front supporting members 30 travel upwardly from the supporting members 14 at an angle and terminate in bent sections 32, which are substantially parallel to the supporting members 14. These bent sections, in turn, lead to rear supporting members 33, formed substantially parallel to the initial front supporting members 30. It is to be understood that all three of the pieces 30, 32 and 33 are formed integrally with one another.

Positioned upon the shaft 16, inwardly of the supporting members 14, is a U-shaped rear support 36, as is best seen in Fig. 2 of the drawing. Attached to the middle section of this support 36, are hinges 42, which serve to connect with upper rear support members 44 having hollow ends 45. Appropriate means such as screws 43 are used to connect these hinges to the U-shaped member 36 and the upper rear support members 44. The portions of the hinges 42 placed upon the upper rear support members 44 are formed with cylindrical pivots 46, holding a handle 47 as is shown in Figs. 2 and 3.

This handle 47 is provided in its sides 49 with stop members 50, projecting internally into the hollow ends 45. It is also provided with curved sections 51 within its sides 49, which are adapted to fit around the lower support member 36, and with rear curved positioning portions 52 placed immediately below these curved sections 51, which are adapted to bring the base 54 of the handle proper into a position such as is shown in Fig. 1 of the drawing when the device of the invention is open or unfolded. The function of this handle 47 will be more fully explained later.

The upper rear support members 44 are formed integrally with top sections 55, which, when the device is opened, are parallel to the sections 32 and which terminate in a front rail 56. These top sections 55 are adapted to pivot about an appropriate pivot 57 connecting them with the members 32. Inasmuch as both these side top sections 55 and members 32 are situated beside one another when the device is in the open position shown in Fig. 1, they form a convenient arm rest for a child seated within the stroller. The rear upper supporting members 33 are preferably tubular in cross-section and contain, near their upper extremities, holes 60 which are traversed by means of sliding sleeves 59 having threaded ends 61 to which there are attached threaded caps 65 in the obvious manner. Other equivalent fastening means besides threads can be used to attach such caps. As an example of this, the caps can be held in position upon the sleeves 59 by means of set screws or the like. Both of the sleeves 59 are connected to one another by means of a bar 64 having a centrally located seat support bar 63. Connected to the ends of this bar 63 are offsets 62 which in turn are connected to the ends 72 of the bar 64 so as to project within central bores 76 within the sleeves 59 as shown in Fig. 4. These ends 72 are free to slide within these bores 76. Within the members 33 the sleeves 59 contain shoulders 77 against which there are placed springs 78 tending to pull the caps 65 towards the members 33 as shown in Fig. 4. On the sleeves 59 between the caps 65 and the members 33, there are held semi-circular portions 66 of a tubular handle 67 and projecting tongues 79 of sliding sleeves 84 by the action of the springs 78. These sleeves 84 contain slots 89 as shown in Fig. 1 of the drawings, through which the sleeves 59 project and the semicircular portions 66 contain holes 90 through which the sleeves 59 project. The upper portions 99 of the sleeves 84 normally surround the tops of the members 33, concave configurations 68 leading from the portions 66 to the handle 67. The upper portion of the handle 67 contains a conventional cross-member 69 which is normally employed in pushing the device.

The seat for the stroller of the present invention comprises a wooden bottom 70, having front curved sections 71, adapted to fit the legs of a child in the conventional manner. The portion of the bottom 70 between these two spaces 71 is supported by a front canvas web 73, attached to the bottom of member 70 by a lower snap 74 and connected over the front rail 56 by a second snap 75. The sides 80 of the seat and the back 87 are attached at their lower extremities to the bottom of member 70 by means of snaps 81, and are attached over the top sections 55 by means of loops 82, connected by means of snaps 83 as indicated. The back 87 of the seat of the device is also attached to the bar 63 by means of loops 85, positioned over this bar and held in place by means of snaps 86. A conventional bag 88 is attached to this back 87 in the conventional manner.

In using the device, the various elements are positioned as is shown in Fig. 1 of the drawings. In this position, the upper tubular supports 44 and the U-shaped member 36 are positioned with respect to one another by means of the hinges 42 in an "over-center" position, in such manner that these members cannot move with respect to one another in a counterclockwise position, as viewed in Fig. 1. Further, the supports 44 and the U-shaped member 36 are "locked" by means of the handle 47 with respect to one another.

In order to fold the device so that it can be carried, the handle 47 is grasped and pulled in an upward direction, causing the stop members 50 to engage the internal walls of the tubular ends 45. This motion will cause the upper supporting members 44 to move in a counterclockwise direction about the pivots 57 (as viewed in Fig. 1). This motion, as transmitted by hinges 42, will in turn cause the lower U-shaped support 36 to rotate in a clockwise direction (also as viewed in Fig. 1) about the shaft 16. As this occurs, the pivots 57 transmit the motion to the members 30, 32 and 33 causing them to rotate about the pivots 31 toward the lower support member 14, placing the handle 67 in a position which is nearly parallel to this lower supporting member. By pulling on the caps 65, the sleeves 84 can then be pulled outwards towards the handle 67, allowing this handle to rotate about the sleeves 59 to a convenient carrying position. If desired, the handle 67 can be rotated prior to the other folding operations. The fabric front, side and rear walls of the seat proper will, of course, collapse during this folding procedure. Once the folding is completed, the device may be easily and conveniently carried by means of the handle portion 54. Preferably, a small cylindrical handle is placed upon it for this purpose. The size of the entire folded device shown, once collapsed, is such as to meet the dimensions of a package which can be brought on board a street car or other like public conveyance.

In opening the new combination stroller and walker of the invention, the motions indicated above are repeated in reverse order. The handle 67 is rotated to the former position and is locked in place by sliding the sleeves 84 downward. By means of pressure applied to the handle member 47, the upper rear supports 44 and U-shaped rear support 36 are again placed in an "over-center" position, and are then locked in this position by means of the curved section 51 of the handle member 47 engaging the U-shaped rear support 36 as is shown in Fig. 3 of the drawings.

Figure 5:
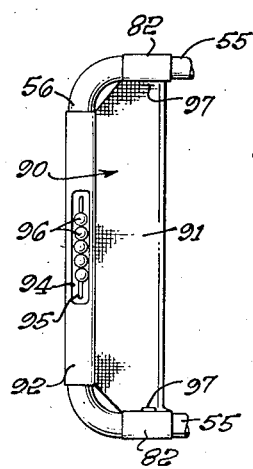
Fig. 5 is a top plan view taken in the direction of the arrow 5 shown in Fig. 1, illustrating a modified construction of the invention.

In employing the device of the instant invention as a stroller, the wire foot support 20 can be removed from the apertures 22 and 24, by a simple snap action. A modified construction illustrated in Fig. 5 of the drawing differs from that shown in the other figures solely in that the front fabric web 73 is replaced by a fabric tray 90, designed to hold toys and the like. This tray consists of a center pocket portion 91, attached at its front by means of a fabric flap 92, secured to the pocket by means of fasteners not shown, in the same manner in which the web 73 was connected over the front rail 56 by the fastener 75. The lower portion of this flap 92 is adapted to be attached to the board 70 by fastener 74, as previously discussed in conjunction with the Fig. 1 of the drawings. Within the front flap 92 there is provided a small aperture 94, through which there projects a wire 95, containing a plurality of beads 96, which are, by virtue of their color and location, designed to attract the attention of any infant positioned within the device. The ends of the tray 90 are secured to the flaps 82 by means of snap fasteners 97.

Those schooled in the art will realize that the herein described invention is capable of modification within the scope of the present disclosure. Modifications which are within the scope of the art, and which are defined by the appended claims, are to be considered as part of the present concept.

I claim as my invention:

1. In a baby stroller the improvement, which comprises: a lower member; a pair of hinges attached to said member; separate hollow support members attached to said hinges, said support members having opposed open ends adjacent to said lower member; a handle rotatably positioned on both of said open ends, said handle including a curved body portion adapted to lock said lower member in place in one position of said hinges and a central portion adapted to be used in grasping the device; and stop means attached within said handle and projecting within both of said open ends whereby, when said handle is moved out of engagement with said lower member, said stop means engage said hollow support members opening said hinges.

2. A new and improved baby stroller and walker, which comprises: parallel lower side supporting bars having front and rear ends; a front bar connecting said front ends; pivoted wheels depending from and attached to said front ends; a shaft connecting said rear ends; a pair of wheels positioned upon said shaft; a pair of first upstanding bars pivotally attached to said side supporting bars near said front ends, said upstanding bars including central offset portions attaching upper and lower terminal lengths; a U-shaped bar having terminal ends and a central body; means defining apertures within said terminal ends, said apertures being traversed by said shaft; a pair of hinges attached to said central body; a pair of second upstanding bars including lower hollow aligned sections, lower parallel support lengths, and parallel side lengths, said second upstanding bars being attached to said hinges by said aligned sections, said parallel side lengths being parallel to said central offset portions and parallel to said lower side supporting bars; pivot means attaching said parallel side lengths and said central offset portions; a front rail bar attaching said parallel side lengths; bar means connecting said upper terminal lengths; a collapsible seat comprising a bottom rigid support, a front fabric hanger removably attached to said front rail bar and said bottom support, side fabric hangers removably attached to said parallel side lengths and to said bottom support, and a rear fabric hanger removably attached to said bar means and said bottom support; handle means collapsibly attached to said upper terminal lengths; and lock means carried by said aligned sections for holding said second upstanding bars and said U-shaped bar in forced configuration.

3. A device as defined in the preceding claim, wherein said handle means comprises: a substantially U-shaped handle having ends, said ends being provided with open semicircular internal cavities adapted to fit around parts of said upper parallel terminal lengths; and means including sleeve means for holding said ends in position with respect to said lengths.

4. A device as defined in claim 2, wherein said lock means comprises a handle pivotally supported upon said aligned sections, said handle including a central portion adapted to be held by a human hand, side curved portions adapted to engage and lock said central body of said U-shaped bar, and stop elements projecting internally within the ends of said hollow aligned sections.

5. In a baby stroller the improvement which comprises: a lower member; a pair of hinges attached to said member, separate support members attached to said hinges, said support members having opposed ends adjacent to said lower member; a handle rotatably positioned on both of said ends, said handle including a curved body portion adapted to lock said lower member in place in one position of said hinges, and a central portion adapted to be used in grasping the device; and stop means attached to said handle, said stop means being capable of contacting said opposed ends whereby when said handle is moved out of engagement with said lower member said stop means engage said support members opening said hinges.

References Cited in the file of this patent

UNITED STATES PATENTS

| | | |
|---|---|---|
| 2,490,988 | Wheeler | Dec. 13, 1949 |
| 2,508,398 | Kelch | May 23, 1950 |
| 2,576,356 | Peterson | Nov. 27, 1951 |
| 2,616,718 | Heideman | Nov. 4, 1952 |
| 2,678,219 | Goodman | May 11, 1954 |

FOREIGN PATENTS

| | | |
|---|---|---|
| 22,209 | Great Britain | Oct. 13, 1902 |
| 570,507 | Great Britain | Mar. 3, 1944 |